US012611363B2

(12) United States Patent
Kellner et al.

(10) Patent No.: US 12,611,363 B2
(45) Date of Patent: Apr. 28, 2026

(54) CLOSURE SYSTEM FOR A MEDICAMENT, AND MEDICAMENT CONTAINER COMPRISING A CLOSURE SYSTEM

(71) Applicant: WIRTHWEIN MEDICAL GMBH & CO. KG, Mühltal (DE)

(72) Inventors: Thorsten Kellner, Bayreuth (DE); Jennifer Karina Seib, Darmstadt (DE); Andreas Dunz, Mühltal (DE); Björn Winterfeld, Riedstadt (DE)

(73) Assignee: WIRTHWEIN MEDICAL GMBH & CO. KG, Mühltal (DE)

( * ) Notice: Subject to any disclaimer, the term of this patent is extended or adjusted under 35 U.S.C. 154(b) by 0 days.

(21) Appl. No.: 18/715,700

(22) PCT Filed: Nov. 30, 2022

(86) PCT No.: PCT/EP2022/083817
§ 371 (c)(1),
(2) Date: May 31, 2024

(87) PCT Pub. No.: WO2023/099547
PCT Pub. Date: Jun. 8, 2023

(65) Prior Publication Data

US 2025/0033836 A1 Jan. 30, 2025

(30) Foreign Application Priority Data

Dec. 1, 2021 (EP) .................................... 21211721

(51) Int. Cl.
*A61J 1/14* (2023.01)
*B65D 51/00* (2006.01)
*B65D 51/20* (2006.01)

(52) U.S. Cl.
CPC .......... *A61J 1/1425* (2015.05); *B65D 51/002* (2013.01); *B65D 51/20* (2013.01)

(58) Field of Classification Search
CPC ...... B65D 51/002; B65D 51/20; A61J 1/1406; A61J 1/1425
See application file for complete search history.

(56) References Cited

U.S. PATENT DOCUMENTS 5,895,383 A * 4/1999 Niedospial, Jr. ..... B65D 51/227 604/416
11,738,915 B2 * 8/2023 Clavel et al. .......... B65D 81/18 215/40

(Continued)

FOREIGN PATENT DOCUMENTS

CA 2134911 A1 * 5/1996 ............. B65D 50/06
DE 9306796 U1 * 5/1993 ........... B65D 51/002

OTHER PUBLICATIONS

International Search Report (ISR) for International Application No. PCT/EP2022/083817 (mailed Feb. 20, 2023).

*Primary Examiner* — Stephen F. Gerrity
(74) *Attorney, Agent, or Firm* — Weitzman Law Offices, LLC

(57) ABSTRACT

A closure system (10) for a medication container (1), the interior (4) of which is accessible via a mouth region (6) designed in the manner of a bottle mouth, wherein the closure system (10) comprises, in addition to a bounce cap (28) which can be pushed onto the mouth region (6) and is provided with a sealing element (24), a locking ring (60) which, in a position pushed completely onto the bounce cap (28), can be pushed onto the bounce cap (28), can be fixed to the bounce cap (28) in a latchable manner by means of a number of snap ribs (62), is intended to be particularly suitable for automated filling operations by simple means. For this purpose, according to the invention, the or each snap rib (62) is guided in a corresponding guiding groove (82) during a movement of the inner lateral surface (84) of the (Continued)

retaining ring (60) relative to an outer lateral surface (80) of the bounce cap (28) corresponding to the latter.

11 Claims, 7 Drawing Sheets

(56) References Cited

U.S. PATENT DOCUMENTS

| | | | | |
|---|---|---|---|---|
| 2010/0224632 | A1 | 9/2010 | Aneas | |
| 2012/0187072 | A1 * | 7/2012 | Belle | B65D 45/32<br>215/274 |
| 2018/0134457 | A1 | 5/2018 | Mutterle | |
| 2018/0141729 | A1 | 5/2018 | Mutterle | |
| 2025/0177249 | A1 * | 6/2025 | Koller | A61J 1/1425 |

* cited by examiner

CLOSURE SYSTEM FOR A MEDICAMENT, AND MEDICAMENT CONTAINER COMPRISING A CLOSURE SYSTEM

FIELD

This disclosure relates to a closure system for a medication container, the interior of which is accessible via a mouth region designed in the manner of a bottle mouth, in particular, a closure system that includes, in addition to a bounce cap which can be pushed onto the mouth region and is provided with a sealing element, a locking ring which can be pushed onto the bounce cap and which, in a position pushed completely onto the bounce cap, can be fixed to the bounce cap in a latchable manner by means of a number of snap-on ribs. This disclosure further relates to a medicament container with such a closure system and to a use of the closure system.

BACKGROUND

Medications, especially for treatment in highly specialized or complex therapies, are usually provided in active ingredient or medication containers, also known as containers or vials. Such a drug container is usually designed in the form of a vial and comprises an interior in which the drug or active ingredient is held and which is accessible via a container opening designed in the form of a bottle mouth. From such a container or receptacle, the active ingredient is then transferred via suitable transfer systems for the actual administration to suitable systems such as a syringe or an intravenous line that provides fluid access to the patient's circulation.

Modem medical procedures or therapies in particular can involve the use of drugs or substances that are actually toxic or otherwise harmful or dangerous. This can pose acute and long-term health risks to staff handling such substances, such as pharmacists and nurses, especially if they are repeatedly exposed to drugs or solvents that could become airborne during preparation, administration of medicines and other similar treatments. This problem can be particularly serious when cytotoxins, antiviral medicines, antibiotics or radiopharmaceuticals are involved. The potential health risks arising from exposure to these drugs include an increased risk of cancer, genetic changes and the like.

Furthermore, in view of the fact that drugs with an extremely high dose price have recently been approved, it is urgently desirable or even necessary to reliably prevent the unintentional release of even the smallest quantities of such drugs or active substances into the environment.

With regard to the prevention of unintentional loss of active ingredients, it is therefore generally necessary to design the medication containers appropriately. Usually, the active ingredient or medication containers are provided with suitable closure systems for this purpose, in which a stopper closes the container opening. This closure plug can then be pierced for removal of the medication by means of a hollow needle, for example, via which the medication can then be sucked out of the container. To secure the stopper, a bounce cap with a ring lid with a central opening can be provided, which can be attached to the "bottle mouth" with the container opening. The stopper is then fitted centrally in the ring cap.

Such a bounce cap provided with the sealing element or stopper is usually attached by sliding it onto the mouth area of the medication container and then latching it onto the container, for example by means of snap-in or latching hooks arranged on the bounce cap, which form a latching connection with latching beads arranged on the container opening. This latching connection is then usually secured against unintentional release by means of a locking ring that can be slid onto the bounce cap, which encloses it laterally in its end position. Such a locking ring ensures that the snap-in or latching hooks arranged on the pop-up cap do not move back outwards and thus release the latching connection with the medication container. The locking ring pushed onto the bounce cap is usually also secured in its position on the bounce cap by means of latching means, for example a number of snap-in ribs.

In addition to the aforementioned requirements for reliability and leak-tightness of such closure systems, a common design objective is also to make them suitable for industrial processing in terms of high quantities. In particular, automated filling and correspondingly automated application of the closure system to the respective medication container should be possible, especially for the possibly desired large number of medication doses to be provided. To this end, it is desirable to enable simultaneous processing of several medication containers in the form of larger batches, for example in the form of so-called "nesting", with regard to large quantities.

BRIEF SUMMARY

The present disclosure is therefore based on the objective of providing a closure system of the above-mentioned type which meets these requirements, in particular the suitability for automated filling processes, to a particularly large extent by simple means.

This objective in accordance with this disclosure is achieved in that the snap-on rib or each snap-on rib provided for fixing the locking ring in the position in which it is fully slid onto the expanding cap is guided in a corresponding guiding slot during a movement of the inner lateral surface of the locking ring relative to a corresponding outer lateral surface of the bounce cap.

This disclosure is based on the consideration that the closure system can be made suitable for automated processing and also for high cycle or throughput rates with the correspondingly high processing speeds by, among other things, on the one hand, particularly favoring pre-assembly of the components bounce cap and securing ring and, on the other hand, ensuring particularly reliable guidance of the pre-assembled components relative to one another. In particular, this makes it possible to eliminate potential sources of interference during automated processing, for example due to tilting or canting of the components, incorrect positioning or the like. The desired reliable guidance of the components mounted upstream relative to each other can be achieved in a particularly simple way by forming a guide pairing for the components using components that are usually already present, in this case the respective snap ribs. To form such a guide pairing, a corresponding guiding slot, for example in the form of a groove, should be assigned to the respective snap rib in the other component.

The term "guide" or "guide pairing" means in particular that the respective elements or components engage with each other in a suitable manner in order to ensure the desired type of relative movement of the components to each other when the locking ring is displaced relative to the bounce cap. For example, in the case of an "axial" guide, the geometry can be selected in such a way that the relative movement is only possible in the axial direction or at least as far as possible, whereby a twisting or rotation of the components relative to each other should be minimized or preferably even completely excluded. Alternatively, with a "tangential" guide, the geometry can be selected in such a way that only rotation of the components is possible, but no axial displacement relative to each other.

For the formation of the aforementioned guide pairing, it is fundamentally irrelevant which elements of it are arranged on which of the components of the bounce cap or retaining ring; i.e., for the intended use, the respective snap rib could be arranged on the inside of the locking ring or also on the outside of the bounce cap, and the associated guiding groove correspondingly on the respective other component thereof. Preferably, however, the or each snap rib is arranged on the inside of the locking ring and, correspondingly, the respective guiding groove is arranged on the outside of the bounce cap.

Typically, a closure system of this type is pressed onto the mouth opening of the medication container in a linear movement after the preassembly of the pop-up cap and locking ring. In the process, the bounce cap is first pushed onto the mouth until it locks into place or otherwise reaches its final position as seen before. Further pressing of the system then causes the locking ring to be pushed onto the bounce cap, increasingly enclosing it. To stabilize this primarily linear movement of the circlip on the bounce cap, the guiding groove advantageously comprises a first axial segment designed in the form of an axial groove and extending in an axial direction parallel to the axis of rotation of the bounce cap or the circlip.

In a further advantageous embodiment, a latching bead for latching the respective snap rib is arranged in this first axial segment, so that the snap rib can be used for latching the components as intended by the design.

In a particularly advantageous embodiment, the locking system is designed for a particularly stable pre-assembly of the bounce cap and locking ring. It is envisaged in some cases before that the locking ring is first fitted onto the bounce cap during pre-assembly. Then, in the manner of a bayonet lock, a twisting of the retaining-locking ring on the bounce cap should provide a mechanically reliable connection between the attached locking ring and the bounce cap, whereby the system can be fully pushed on from this position later, when it is finally attached to the medication container. To make this possible, the guiding groove in a particularly advantageous embodiment has a tangential segment in the form of a tangential groove extending in a tangential direction around the axis of rotation of the cap or the locking ring.

The tangential segment of the guiding groove expediently merges into its first axial segment, whereby a stop for the respective snap-on rib is formed in the transition area between the tangential segment and axial segment to limit the rotation of the locking ring relative to the cap. This means that during pre-assembly, the respective snap-in rib can first be pushed into the tangential segment of the guiding slot assigned to it and then the locking ring can be rotated relative to the bounce cap. This guides the snap-in rib in the tangential segment until it hits the stop. This ends the twisting process and the locking ring is fixed in a defined and reproducible position on the bounce cap. In this position, the snap rib is then also located in the transition area from the tangential segment of the guiding groove to its axial segment, so that the locking ring can be pushed onto the bounce cap in the axial direction from this position. The components are in secure engagement with each other, so that the pre-assembled closure system is particularly well suited for automated further processing, even with high loads and high quantities.

In a further advantageous embodiment, a detent tooth with a beveled stop surface for the snap-in rib is arranged in the tangential segment of the guiding groove. Due to the bevel, the snap-in rib can be pushed over the detent tooth when it is moved in the tangential segment during the torsion described above, although on the other hand, due to the shape of the detent tooth, a backward movement of the snap-in rib over the detent tooth is no longer possible. As a result, the snap-in rib is thus fixed in its end position in the tangential direction, so that a particularly stable and reliable pre-assembly of the components is achieved.

In an advantageous embodiment, the bounce cap and/or the locking ring is made of a plastic, preferably polypropylene (PP), a polyolefin, cyclo-olefin-co polymer (COC), cyclo-olefin-polymer (COP) or polycarbonate.

In an embodiment which is regarded as independently inventive, a closure system of the above-mentioned type, preferably in conjunction with the embodiment explained above, is provided with a tamper-evident closure for the medication container. The closure system can be provided with an additional external closure element in the form of a disposable closure. This disposable closure, which can for example comprise a tear-off or sealed sealing lid, allows easy and reliable identification of whether the container has already been used for liquid transfer or not, and thus makes it easier to determine whether the container has already been "opened" and should therefore preferably be used for further liquid withdrawal until it is completely empty and should therefore be disposed of. For this purpose, in this preferred embodiment, a sealing plate is firmly attached to the outside of the locking ring and can be torn off from it to form a tamper-evident seal.

A medication container, the interior of which is accessible via a container opening designed in the manner of a bottle mouth, closed with a closure system of the type described above, is also regarded as independently inventive.

The use of a closure system of the aforementioned type for a medication container is also regarded as independently inventive.

The advantages achieved with the invention include, in particular, the fact that a particularly high mechanical stability of the pre-assembled intermediate product consisting of the locking ring and the bounce cap can be achieved by providing a guide pairing between the locking ring and the bounce cap by means of the respective snap rib on the one hand and the associated guiding groove on the other side. This pre-assembled intermediate product is therefore also particularly suitable for subsequent processing steps with comparatively high stresses, for example as part of automated processing or in processes with a high number of cycles or units.

BRIEF DESCRIPTION OF THE DRAWINGS

An embodiment of the invention is explained in more detail with reference to a drawing. It shows.

Identical parts are marked with the same reference numerals in all figures.

DETAILED DESCRIPTION

Figure 1:
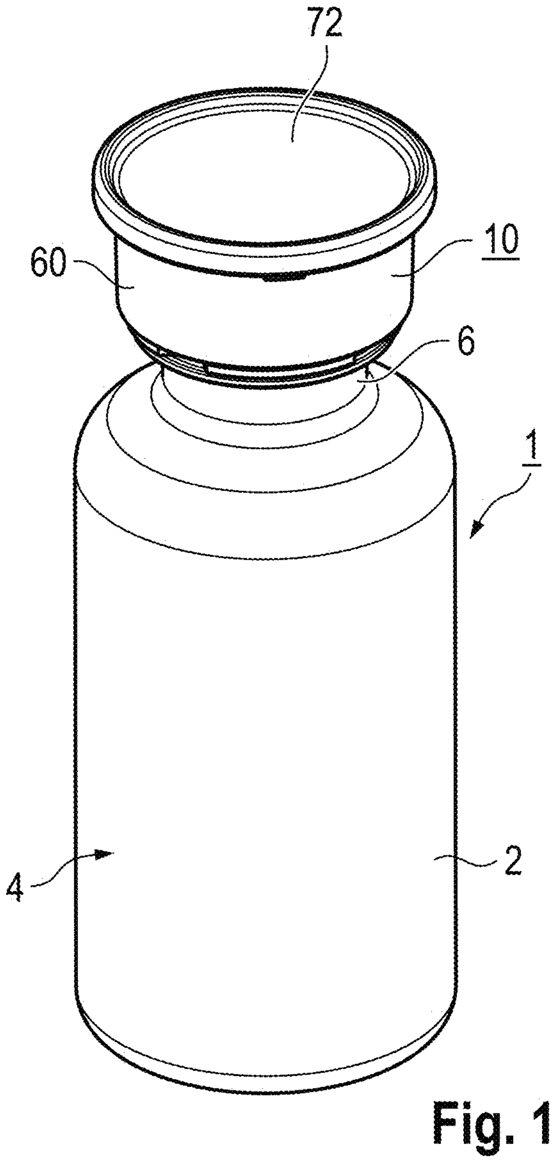
FIG. 1 shows a medication container closed with a closure system.

The medication container 1 as shown in FIG. 1, also known as a container or vial, is designed in the form of a small bottle. It comprises an interior 4 enclosed by a container wall 2, in which the medication or active ingredient is held. In the embodiment shown, the container wall 2 is made of a suitably selected plastic with or without a barrier layer. A "medical grade" plastic is particularly preferred, such as COP variants 690R®, 790R®, COC variants Topas® 8007S-04, 6013S-04, 6015S-04. The plastic is particularly preferably selected with regard to the criteria transparent, unbreakable, little to no interaction with the intended medication, medical grade, in particular usable as a glass substitute, individually or in combination with each other, suitable net. The interior 4 is accessible via a container opening 6 designed in the manner of a bottle mouth.

The medication container 1 is designed in particular for holding active substances or medicines for which any loss of material due to unintentional release into the environment or surroundings should be avoided as far as possible. This may be the case, for example, for toxic substances, substances that are hazardous to health or otherwise dangerous for the persons handling them, or for particularly expensive substances or active ingredients, such as those increasingly used in modern therapies. In order to keep such undesirable material losses particularly low, the medication container 1 is equipped with a closure system 10 that closes the container opening 6 and is designed for particularly high tightness on the one hand and for particularly effective protection against manipulation on the other.

Figure 2:
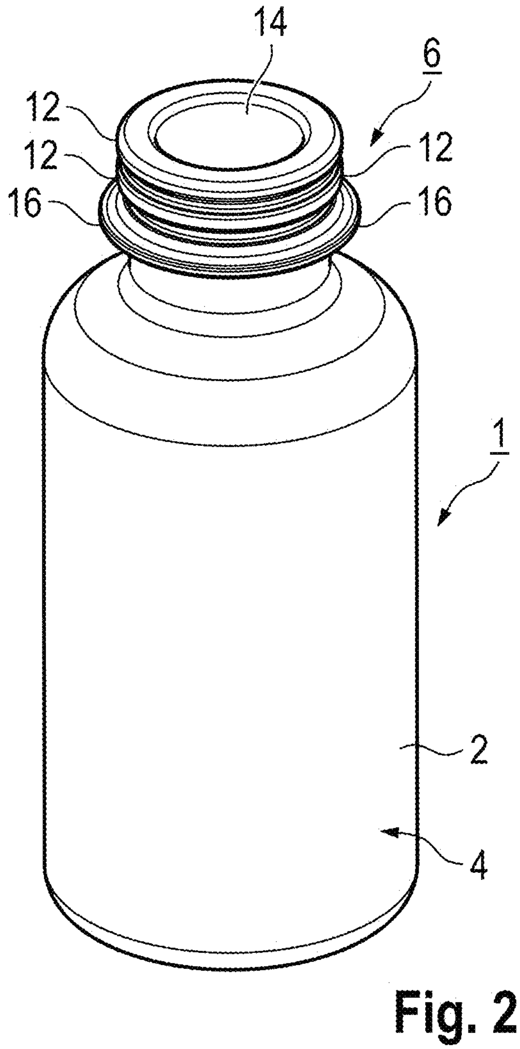
FIG. 2 shows a perspective view of the container opening of the medication container according to FIG. 1.
Figure 3B:
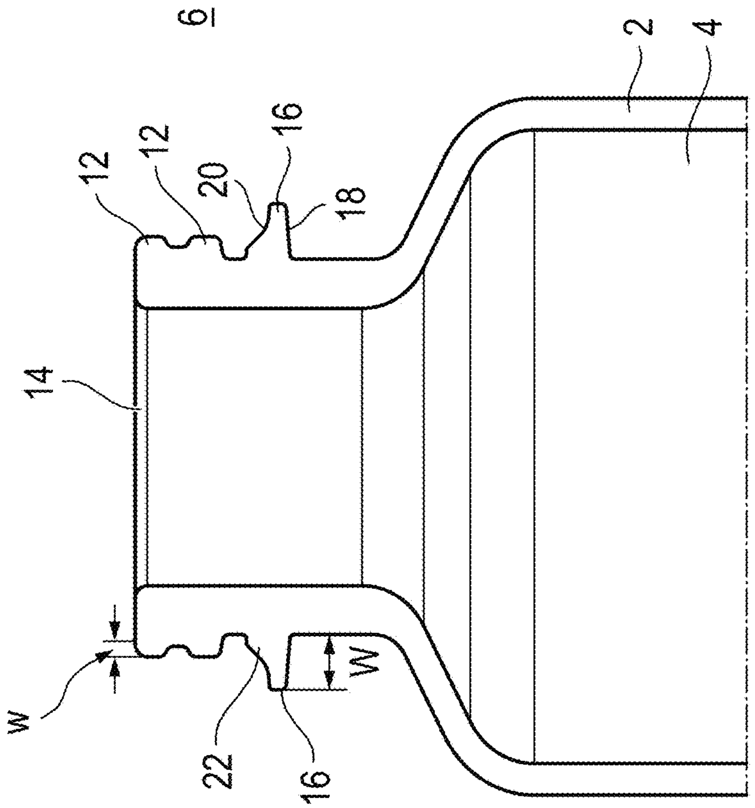
FIG. 3 shows the container opening of the medication container according to FIG. 1 in longitudinal section.
Figure 3A:
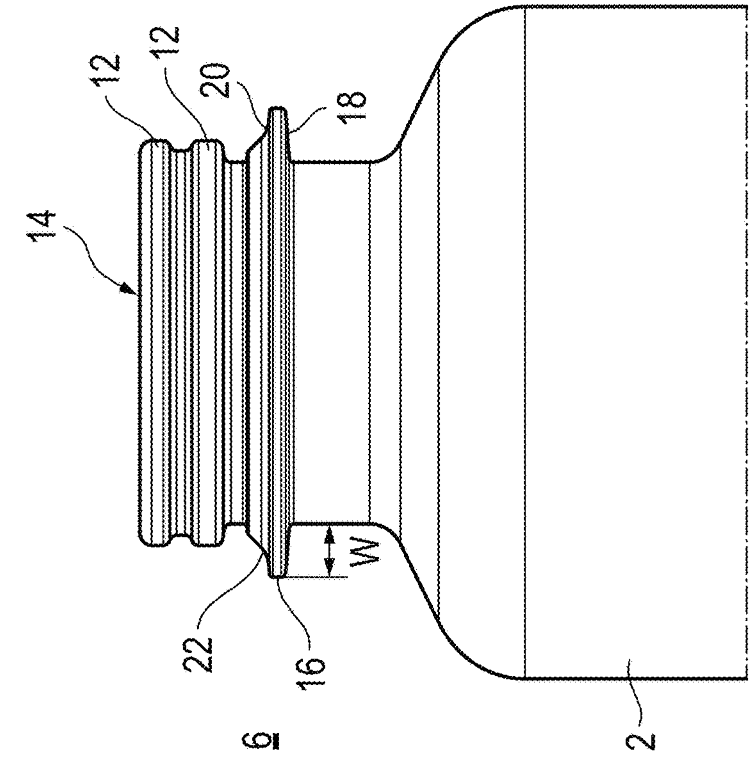

As can be clearly seen from the perspective view in FIG. 2 and the longitudinal sectional view in FIG. 3, the container wall 2 of the medication container 1 is provided in the area of the container opening 6 with a number of outer beads 12, two in the embodiment shown, attached in a circumferential manner as a fastening element for the closure system 10. A first of these outer beads 12 is arranged directly adjacent to the mouth opening 14 of the medication container 1; a second outer bead 12, on the other hand, is located at a distance from the mouth opening 14. Subsequently, in relation to the longitudinal direction of the container opening designed in the manner of a bottle mouth, such a positioning further away from the mouth opening is referred to as "bottom" or "proximal", whereas a positioning more towards the mouth opening 14 and thus towards the free, open end of the container opening 6 is referred to as "top" or "distal".

As can be clearly seen in particular from the representation in longitudinal section as shown in FIG. 3*b*, the two upper outer beads 12 attached circumferentially to the container opening 6 have an approximately or completely identical bead width w. This design is chosen with regard to the intended use of these outer beads for latching or fixing with associated latching or snap-in elements of the closure system 10. In contrast, the lowest or proximal outer bead 16, as seen in the direction of the mouth opening, is designed with a bead width W that is significantly larger than that of the outer beads 12 by a factor of about three, i.e., significantly more than at least 150% of the bead width w of the adjacent outer bead 12, in order to improve the protection against tampering.

In the embodiment example, as can be clearly seen from the illustration in FIG. 2, the outer beads 12, 16 are completely circumferential. In other embodiments, the outer beads 12, 16 could be fully or partially segmented, i.e., comprise several segments that follow one another in the rotational direction and are positioned at a distance from one another, forming gaps between them.

A further particularly preferred aspect of the present invention relates to the transverse sectional profile of the limiting outer bead 16. As can be seen from the illustration in FIG. 3, the limiting outer bead 16 has on its lower side facing away from the mouth opening 14 a largely straight flank 18 which is tilted with its normal towards above the longitudinal axis of the container opening 6 by a maximum of 10°. On the one hand, this design achieves a particularly reliable two-dimensional covering of the closure system 10 arranged above, while on the other hand forming a particularly favourable and suitable contact surface for automated handling purposes.

Furthermore, on its upper side facing the mouth opening 14, the limiting outer bead 16 has an orifice-side flank 20 which, as explained below, is specifically designed for favourable interaction with the closure system 10. In particular, the upper flank 20 of the limiting outer bead 16 forms a contact surface 22.

Figure 4A:
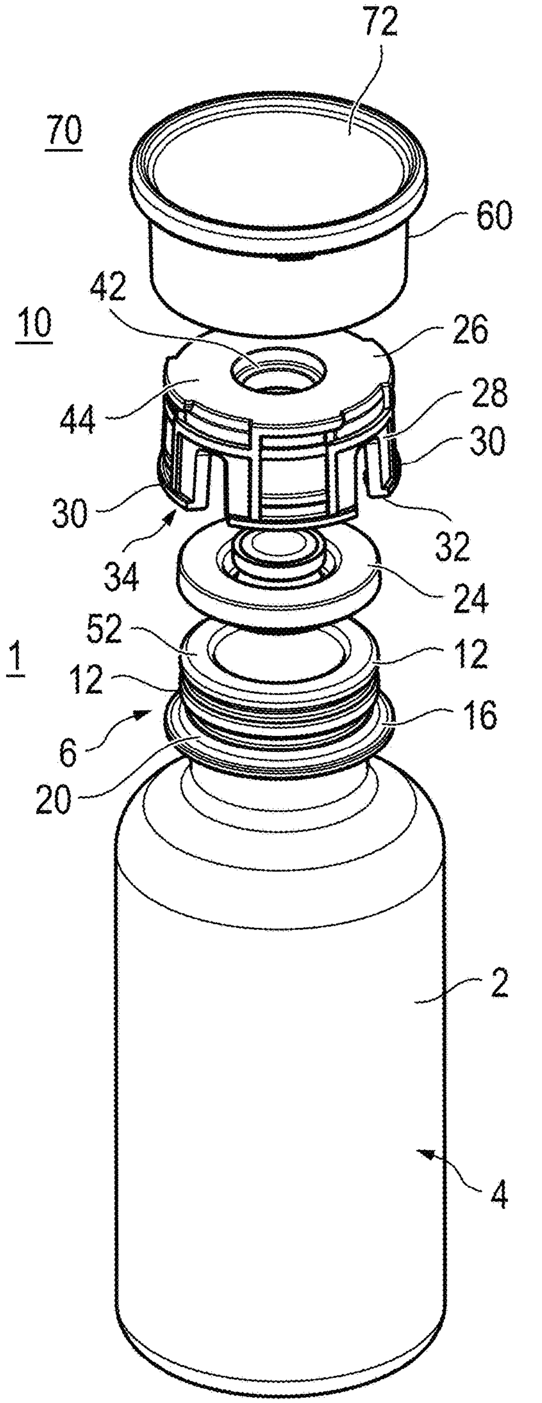
FIG. 4 shows an exploded view of the medication container according to FIG. 1 with associated closure system in longitudinal section.
Figure 4B:
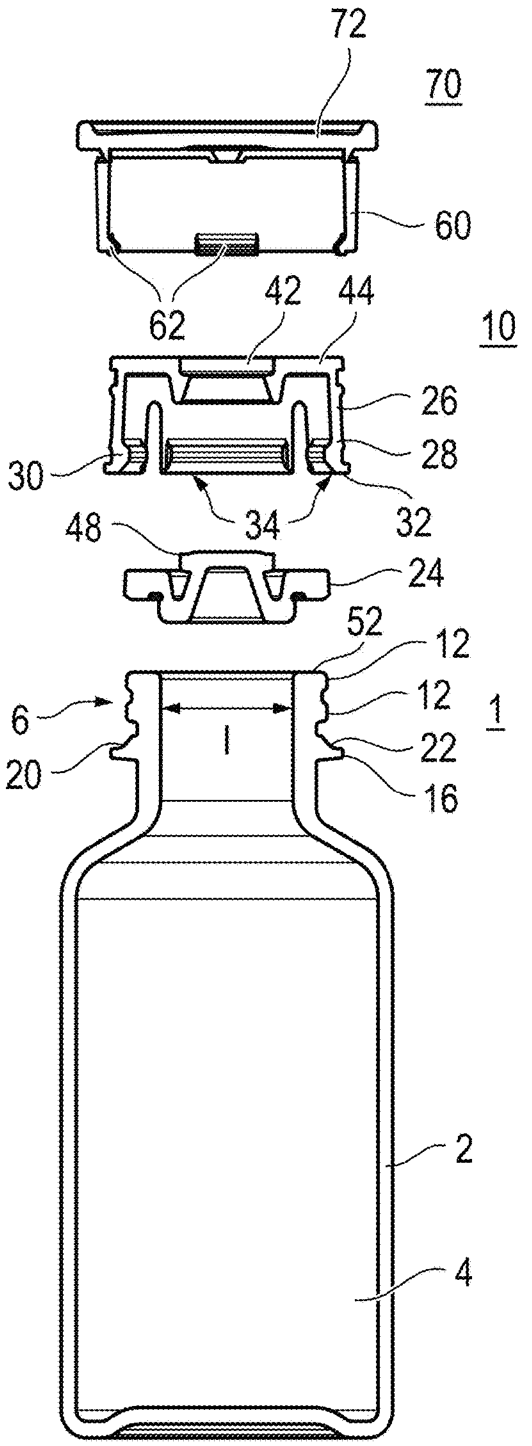

In FIG. 4, the mouth area of the medication container 1 together with the associated closure system 10 is shown in exploded view, in FIG. 4*a* in lateral top view and in FIG. 4*b* in longitudinal section. The closure system 10 comprises, as essential components, a sealing element 24 designed as a closure plug for closing the container opening 6 and a fixing cap 26, with which the sealing element 24 can be firmly attached to the container opening 6. Adapted to the outer beads 12, the fixing cap 26 is made in the form of a bounce cap 28, on the outer circumference of which a number of snap-on hooks or latching elements 30 are arranged to engage with the respective outer bead 12. When attaching the bounce cap 28, it can thus be pushed or bounced onto the container opening 6, whereby the latching elements 30 are first bent outwards through the respective outer bead 12 and then, after being pushed on further, engage behind the outer bead 12 and latch onto it in the manner of a snap-on connection. Furthermore, with regard to its dimensions in the longitudinal direction of the container opening 6, the bounce cap 28 is adapted to the outer contour formed by the outer beads 12, 16, such that the frontal area 34 of the or each latching elements 30 formed by the end edge 32 of the bounce cap 28 rests against the contact sur-face 22 arranged on the opening-side flank 20 of the limiting outer bead 16 when the bounce cap 28 is fully pushed onto the container opening 6.

Figure 5A:
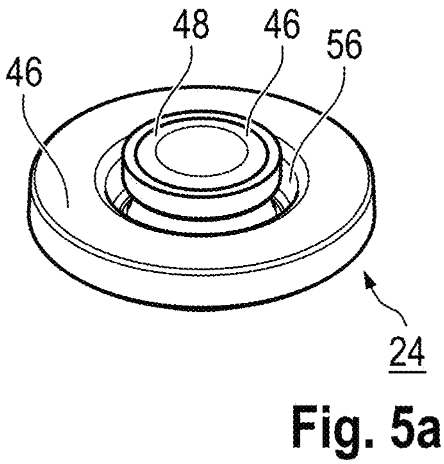
FIG. 5 shows a sealing element for the medication container according to FIG. 1.
Figure 5B:
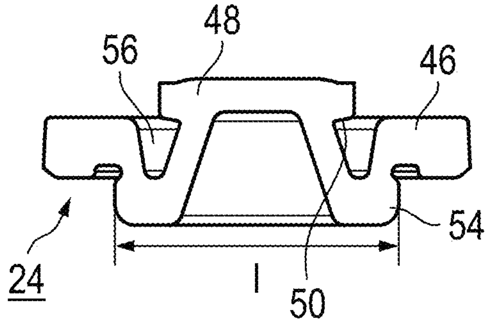

The bounce cap 28 comprises a ring cover 44 having a central opening 42. The sealing element 24, which in itself is designed as a single piece and is shown enlarged in FIG. 5, on the other hand, comprises a locking plate 46 in the manner of a basic element, on the first plate side of which a thickening 48 is formed which completely fills the central opening 42 of the ring cover 44 and can be brought into engagement with the latter in a latching manner. In its connection area with the locking plate 46, the thickening 48 is provided with a circumferential nut 50 forming an undercut. The one-piece sealing element 24 is, also with regard to the desired sealing purposes, made of a suitable and also comparatively soft and easily deformable material, in the embodiment shown of rubber or TPE, preferably "medical grade". This choice of material also ensures that the sealing element 24 can be pierced with a suitable instrument, such as a hollow needle, if necessary, i.e., if active ingredient is to be removed from the medication container 1. Using these material properties, in particular the deformability, the sealing element 24 can be more or less firmly connected to the bounce cap 28 by inserting the thickening 48 into the opening 42 in the ring cover 44 and the circumferential edge of the opening 42 then engaging in the nut 50 and thus fixing the sealing element 24 to the bounce cap 28.

In an advantageous manner, the sealing element 24 contributes to sealing the container opening 6 in two ways. On the one hand, a sealing effect is achieved, quite comparable with known systems, in that in the assembled system the locking plate 46, which is suitably adapted in its dimensions, in particular its outer diameter, to the mouth edge 52 of the container opening 6, is pressed onto the mouth edge 52 by the rim of the sealing element 24 by means of the bounce cap 28, which can be latched onto the mouth edge 52. As a result of this axial force seen in relation to the longitudinal axis of the container opening, the locking plate 46 can already develop a sealing effect due to the deformability of the material. In addition, however, the provision of radial force components, i.e., contact pressure forces that press the sealing element 24 in the radial direction against the inside of the container wall 2 in the area of its mouth, is also provided in the present case for a particularly increased sealing effect overall.

For this purpose, a radial sealing element 54 is formed on the second plate side of the locking plate 46. The cross-sectional shape of the radial sealing element 54 is adapted to the transverse cross-sectional shape of the container opening 6 in the mouth area (in the embodiment example, both are round). In terms of its dimensions, it is also adapted to the clear width 1 of the container opening 6 and, with regard to the deformability of the material of the sealing element 24, is slightly larger than the clear width 1 of the container opening 6. As a result, when the radial sealing element 54 is inserted into the container opening 6, taking into account the deformability of its material, a surface pressure or pressing effect is created on the inner wall of the container in the area of the container opening. With regard to common standards and usual norms for such components, the container opening can be suitably selected and dimensioned; for example, its clear width can be suitably adapted to the standard dimension "13 neck" (corresponds to an outer diameter of the container opening of 13 mm) or to the standard dimension "20 neck" (corresponds to an outer diameter of the container opening of 20 mm).

Figure 6A:
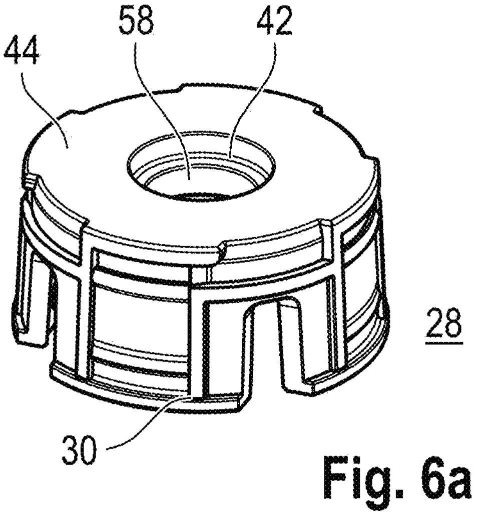
FIG. 6 shows the bounce cap of the closure system of the medication container according to FIG. 1.
Figure 6B:
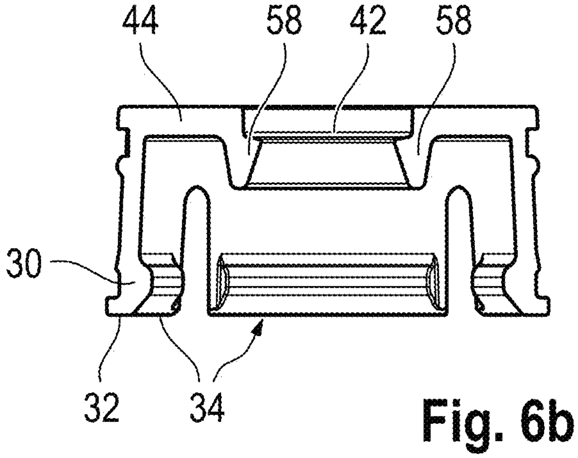

The sealing element 24 is advantageously designed for an even further improved sealing effect in the radial direction. For this purpose, the shape is selected such that the central area of the sealing element 24 forming the thickening 48 is surrounded by a circumferential nut or trench-like deepening 56 extending deep into the locking plate 46. The deepening 56 can also completely penetrate the material thickness of the locking plate 46, so that the sealing element 24 is more component in this design. Adapted to this, the bounce cap 28, as shown in FIG. 6*a* in perspective view from below and in FIG. 6*b* in enlarged longitudinal section, has a reinforcement ring 58 formed on the underside of the ring cover 44 and running around the opening 42. During assembly of the two components, this reinforcement ring 58 is inserted into the deepening 56 of the sealing element 24. The dimensions are coordinated in such a way that the reinforcement ring 58 gives the radial sealing element 54 of the sealing element 24 increased strength and rigidity towards the outside, i.e., in the radial direction, and thus further improves the radial seal. In particular, the appropriately selected dimensions of the reinforcement ring 58 can slightly deform the radial sealing element 54 more or less towards the outside and thereby generate an additional contact pressure force in the radial direction against the inner wall of the medication container 1 in the region of the container opening 6.

In the embodiment example, the bounce cap 28 is made of a suitably selected plastic, namely polypropylene (PP), a polyolefin, cyclo-olefin copolymer (COC), cyclo-olefin polymer (COP) or polycarbonate.

Figure 7:
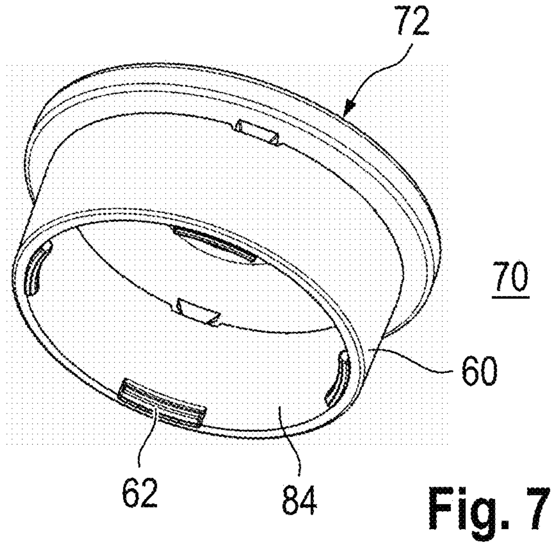
FIG. 7 shows a locking ring of the closure system of the medication container according to FIG. 1.

As a further component, as is again clear from the illustration in FIG. 4, the closure system 10 comprises a locking ring 60, shown enlarged in perspective view from below in FIG. 7, which can be slid onto the bounce cap 28. After the bounce cap 28 has been bounced on and latched with the outer beads 12, this ring can be pushed onto the bounce cap 28 from the outside, embracing it. This fixes the latching elements 30 radially so that they can no longer move outwards. As a result, the latching of the bounce cap 28 with the outer bead 12 can no longer be easily released and is therefore fixed. For its part, the locking ring 60 has a number of snap ribs 62 formed on the inside and positioned at the end, by means of which it can be fixed to the bounce cap 28 in a latching manner.

Furthermore, the medication container 1 closed with the closure system 10 has an originality seal closure 70 as a component. This is intended to ensure, in the manner of a disposable closure, that the user can easily and reliably determine whether the medication container 1 has already been used for liquid transfer or not, i.e., whether active ingredient has already been removed or not. It therefore makes it easier to determine whether the container has already been "opened" and should therefore preferably be used for further liquid withdrawal until it is completely empty and should therefore be disposed of. The originality seal 70 is designed as a sealing plate 72 moulded onto the locking ring 60. The sealing plate 72 is dimensioned and positioned in such a way that, in the assembled state, it completely covers the central opening 2 of the ring cover 44 and thus the exposed surface of the sealing element 24 accessible by it. To access the inside of the medication container 1, i.e., to remove the active ingredient, the sealing plate 72 must first be removed so that the sealing element 24 can be pierced.

The closure system 10 of the medication container 1 is designed for a particularly stable pre-assembly of the locking ring 60 on the bounce cap 28, so that the system assembled before is also particularly suitable for subsequent process steps with high stress, for example in the context of automated filling or packaging processes. For this purpose, the snap ribs 62 are also used in the manner of an additional function to form a guide pairing which, in addition, as shown in the perspective view of the bounce cap 28 in FIG. 8, also comprises a guiding groove 82 arranged in the outer lateral surface 80 for each of the snap-on ribs. The guide pairing formed by the snap rib 62 on the one hand and the corresponding guiding groove 82 on the other hand ensures that the respective snap rib 62 is guided in the corresponding guiding groove 82 during a movement of the inner lateral surface 84 of the locking ring 60 relative to the outer lateral surface 80 of the bounce cap 28 corresponding thereto, so that the positions of these components relative to one another can be adjusted in a reproducible and controllable manner.

In the embodiment shown, the respective snap rib 62 is arranged on the inside of the locking ring 60 and correspondingly the respective guiding groove 82 is arranged on the outside of the bounce cap 28; alternatively, however, the snap rib 62 could also be positioned on the bounce cap 28 and correspondingly the guiding groove 82 on the inner lateral surface 84 of the locking ring 60.

Figure 8:
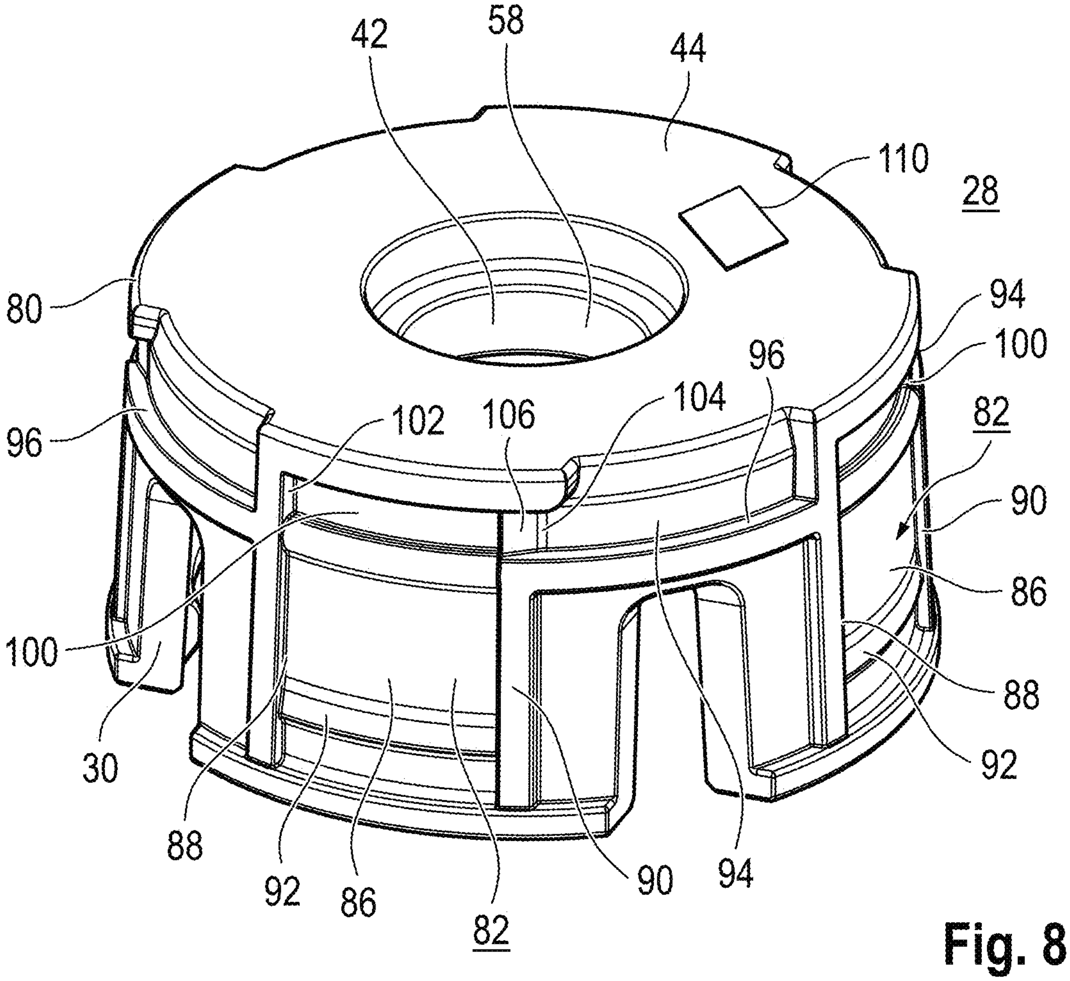
FIG. 8 shows an enlarged perspective view of the bounce cap according to FIG. 6.
Figure 9:
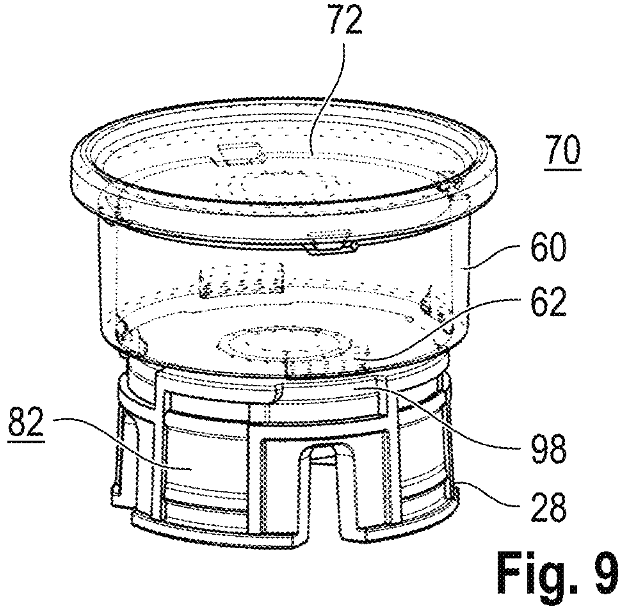
FIG. 9-12 shows a sequence of steps in attaching the closure system to the medication container according to FIG. 1.
Figure 10A:
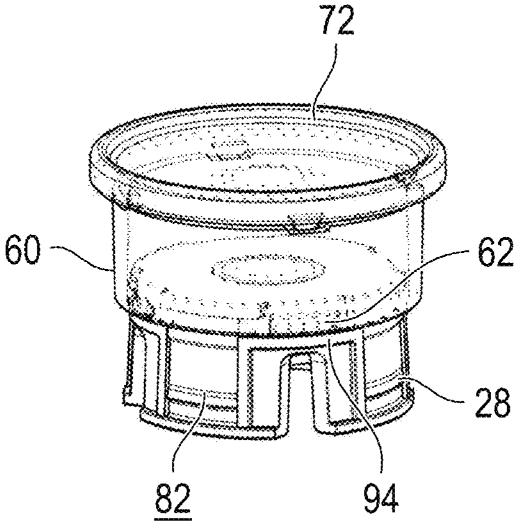
Figure 10B:
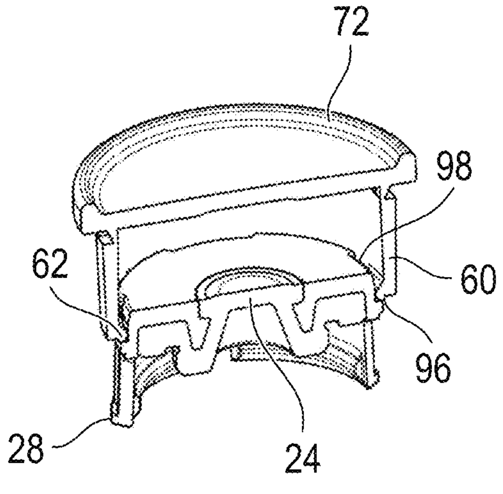

As can be clearly seen from the illustration in FIG. 8, the guiding groove 82 comprises a first axial segment 86 designed in the manner of an axial groove and extending in an axial direction parallel to the axis of rotation of the bounce cap 28. This axial segment 86 is delimited on both sides by a respective linear guiding edge 88, 90, which is guiding the respective snap rib 62 when the locking ring 60 is pushed onto the bounce cap 28. Furthermore, a latching bead 92 is arranged in the first axial segment 86. As soon as the snap rib 62 has been pushed over the latching bead 92 when the locking ring 60 is pushed onto the bounce cap 28, the respective snap rib 62 is latched to the latching bead 92.

Furthermore, the guiding groove 82 has a tangential segment 94 which is designed in the manner of a tangential groove and extends in a tangential direction around the axis of rotation of the bounce cap 28. In a first area, the tangential segment 94 has a lower or proximal guiding edge 96, above which an extension of a second axial segment 98 is formed with an open opening area, into which the respective snap rib 62 can be inserted. When the locking ring 60 is pushed onto the bounce cap 28, the guiding edge 96 forms a stop for the respective snap rib 62 and thus prevents a further linear push-on movement. The tangential segment 94 also merges into the axial segment 86, whereby a stroke 102 for the respective snap rib 62 is formed in the transition area 100 between tangential segment 94 and axial segment 86. This is used to limit the rotation of the locking ring 60 relative to the bounce cap 28.

In the tangential segment 94 of the guiding groove 82 there is also a latching tooth 104 with an inclined stop surface 106 for the snap rib 62.

The attachment of the closure system 10 to the medication container 1 is shown in FIGS. 9 to 12 using a sequence of steps. In a first step, shown in FIG. 9, the locking ring 60, designed as an originality seal 70 and provided with the sealing plate 72, is first positioned with its snap ribs 62 above the inlet opening areas of the respective second axial segments 98 on the pre-assembled bounce cap 28, which is already provided with the sealing element 24. Then, as shown in FIG. 10*a* in perspective view and in FIG. 10*b* in perspective section, the locking ring 60 is pressed linearly downwards onto the bounce cap 28 and thus pushed onto it. In the process, the snap ribs 62 dip into the second axial segment 98 of the respectively assigned guiding groove 82 until they abut against the guiding edge 96. During pre-assembly, the respective snap rib 62 is thus initially pushed into the tangential segment 94 of the guiding groove 82 assigned to it.

Figure 11A:
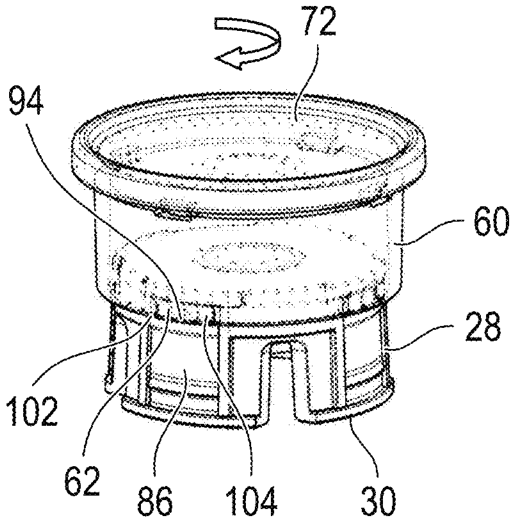
Figure 11B:
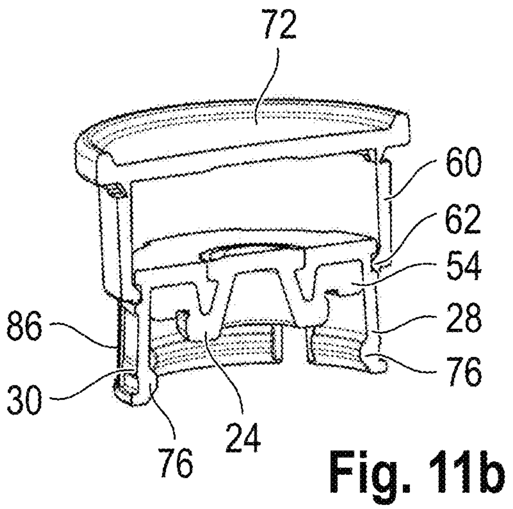

Subsequently, it is intended to rotate the locking ring 60 relative to the bounce cap 28; this is shown in FIG. 11*a* in perspective view and in FIG. 11*b* in perspective section. This twisting causes the respective snap rib 62 to be guided in the respective tangential segment 94 until it strikes the stroke 102. This ends the rotation. During rotation, the snap rib 62 is also moved over the detent tooth 104 arranged in the tangential segment 94, which is possible due to the bevel of the stop surface 106 in this direction of rotation. Due to the asymmetrical contour of the latching tooth 104, however, backward rotation is then no longer possible, so that the locking ring 60 is then also secured against rotation with respect to the bounce cap 28. The locking ring 60 is thus fixed both axially and rotationally in a defined and reproducible position on the bounce cap 28.

In this position, the snap rib 62 is then also located in the transition area 100 from the tangential segment 94 of the guiding groove 82 to its first axial segment 86. From this position, the locking ring 60 can later be pushed onto the bounce cap 28 in the axial direction. The components are in secure engagement with each other, so that the pre-assembled closure system 10 is particularly suitable for automated further processing, even under high loads and in large quantities.

Starting from this pre-assembled state, the closure system 10 can then be attached to the container opening 6 immediately or at a later time, as required. Under certain circumstances and depending on requirements, the intermediate position shown in FIG. 11*b* can be adopted first. In this intermediate step, the embodiment provided in the embodiment example is used, in which two circumferential outer beads 12 in the form of a double bead are provided on the outside in the mouth area of the container opening 6. In this embodiment, the outer beads 12 are separated from each other by a nut 74 running between them. In such a design, it is possible to push the closure system 10 onto the container opening 6 in a first step only to such an extent that the latching hooks 76 formed on the latching elements 30 only engage in the nut 74 and initially lock the system there. In this intermediate state, which is shown in FIG. 11*b*, the sealing element 24 does not yet close the container opening 6, since the radial sealing element 54 has not yet penetrated into the interior of the container opening 6. Rather, in this state, a circumferential annular gap that is still open is formed between the radial sealing element 54 and the mouth 14 of the medication container 1. Together with the circumferential gaps between the individual latching elements 30 of the bounce cap 28, there is therefore still a gas-side connection between the interior 4 of the medication container 1 and the external environment in this state.

This position can be used, for example, for freeze-drying, also known as lyophilization or sublimation drying, of the active ingredient in the medication container 1. This is now a widely used process for the gentle drying of products, which is used for a variety of medications or active ingredients in order to preserve them. In such a freeze-drying process, it may be necessary to be able to release the resulting gases or vapors, in particular water vapor, into the environment, and the positioning of the components shown in FIG. 11*b* offers such a possibility.

Figure 12A:
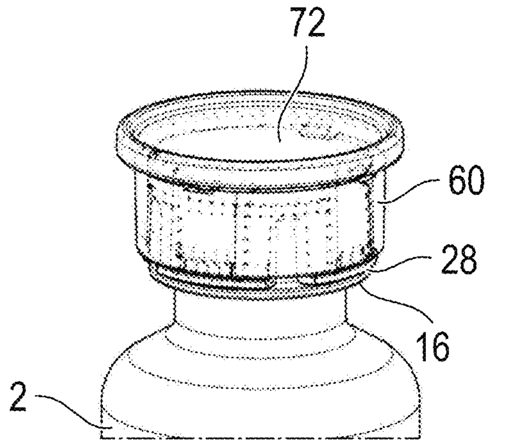
Figure 12B:
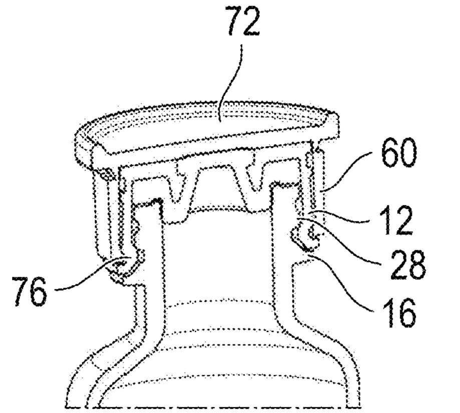

After this intermediate step, or possibly also directly after the pre-assembly shown in FIG. 11 if no such intermediate step is required, the process of closing is then completed and the system is transferred to the fully closed state shown in FIG. 12. For this purpose, the bounce cap 28 is first pushed axially onto the container opening 6 so that the sealing element 24 now penetrates into the container opening 6 with its radial sealing element 54 until the locking plate 46 rests with its outer edge on the mouth of the container 1 and then, with slight deformation of the locking plate 46 as seen in the longitudinal direction of the container opening 6, the latching hooks 76 of the bounce cap 28 engage below the second or lower outer bead 12. The locking ring 60 is then moved downwards so that it engages around the outside of the bounce cap 28. This locks the latching elements 30 in their position and the medication container 1 is securely closed in the position shown in FIG. 12.

From this illustration, i.e., in the fully assembled state, it can also be seen that the lower limiting outer bead 16 secures the slid-on closure system 10 at the bottom and thus increases the protection against tampering. Due to the significantly increased bead width W of the limiting outer bead 16 compared to the outer beads 12, the open end area of the components pushed on top of each other (bounce cap 28, locking ring 60) is covered from below and thus protected against tampering. In addition, the edge 32 of the impact cap lies against the contact surface 22, so that further support can be provided here.

As can also be clearly seen from the representation of the bounce cap 28 in FIG. 6*a* or FIG. 8, an RFID chip 110 is arranged on its ring cover 44, preferably injected into the latter, in an embodiment which is regarded as independently inventive. The RFID chip 110 can be provided with a code or identifier that individually identifies the medication container and/or can contain further information regarding the contents, for example the composition of the medication or active ingredient, any expiry date, a batch number, the raw materials used, production and manufacturing information of the manufacturer or the like. In particular, since such a chip can also be read without contact, automated handling of the medication container 1 and its contents, up to fully or partially automated medication production in mixing systems or the like, can be achieved.

LIST OF REFERENCE SYMBOLS

1 medication container
2 container wall
4 Interior
6 container opening
10 closure system
12 Outer bead
14 Mouth opening
16 Limiting outer bead
18 Lower flank
20 Upper flank
22 Contact surface
24 Sealing element
26 Fixing cap
28 Bounce cap
30 Latching elements
32 Edge
34 Frontal area
42 Opening
44 Ring cover
46 Locking plate
48 Thickening
50 Nut
52 Mouth edge
54 Radial sealing element
56 Deepening
58 Reinforcement ring
60 Locking ring
62 Snap ribs
70 Original seal
72 Sealing plate
74 Nut
76 latching hook
80 Lateral surface
82 Guiding groove
84 Lateral surface
86 Axial segment
88, 90 Guiding edge
92 latching bead
94 Tangential segment
96 Guiding edge
98 Second axial segment
100 Transition area
102 Stroke
104 latching tooth
106 Stop surface
110 RFID chip
w Bead width
W Width of the limiting outer bead
D Diameter
L Light expanse

The invention claimed is:

1. A closure system for a medication container having an interior that is accessible via a mouth region designed in the manner of a bottle mouth, the closure system comprising: a bounce cap which can be pushed onto the mouth region; a sealing element for sealing the mouth region when positioned between the bounce cap and mouth region; and a locking ring which can be pushed onto the bounce cap, wherein, when in a position pushed completely onto the bounce cap, the locking ring can be fixed to the bounce cap by one or more snap ribs, and wherein each snap rib is guided in a corresponding guiding groove in the bounce cap during a movement of an inner lateral surface of the locking ring relative to a corresponding outer lateral surface of the bounce cap.

2. The closure system according to claim 1, wherein each snap rib is arranged on an inside of the locking ring and, corresponding thereto, the respective guiding groove is arranged on an outside of the bounce cap.

3. The closure system according to claim 2, wherein the guiding groove comprises a first axial segment designed in the manner of an axial groove and extending in an axial direction parallel to an axis of rotation of the bounce cap or of the locking ring.

4. The closure system according to claim 3, wherein the first axial segment includes a latching bead arranged for latching the respective snap rib.

5. The closure system according to claim 4, wherein the guiding groove comprises a tangential segment designed in the manner of a tangential groove and extending in a tangential direction around the axis of rotation of the bounce cap or of the locking ring.

6. The closure system according to claim 5, wherein the tangential segment of the guiding groove merges into its first axial segment, and wherein a stroke for the respective snap rib is formed in the transition area between the tangential segment and axial segment for limiting a rotation of the locking ring relative to the bounce cap.

7. The closure system according to claim 6, wherein the tangential segment includes a latching tooth with a beveled stop surface for the snap rib.

8. The closure system according to claim 7, wherein at least one of the bounce cap or locking ring is made of a plastic.

9. The closure system according to claim 8, wherein at least one of the bounce cap or locking ring is made of polypropylene (PP), a polyolefin, cyclo-olefin copolymer (COC), cyclo-olefin-polymer (COP) or polycarbonate.

10. The closure system according to one of claim 1, further comprising a sealing plate is firmly moulded on the outside of the locking ring to form an originality seal that can be torn off of the locking ring.

11. A medication container for an active medical ingredient or a medication, the medication container having an interior that is accessible via a mouth region designed in the manner of a bottle mouth, with the medication container comprising a closure system according to claim 1.

* * * * *